(12) United States Patent
Telfer et al.

(10) Patent No.: US 12,130,534 B2
(45) Date of Patent: Oct. 29, 2024

(54) COLOR ELECTROPHORETIC LAYER INCLUDING MICROCAPSULES WITH NONIONIC POLYMERIC WALLS

(71) Applicant: E INK CORPORATION, Billerica, MA (US)

(72) Inventors: Stephen J. Telfer, Arlington, MA (US); Rosa Casado, Middleton, MA (US); Sergey Egorov, Nashua, NH (US); Erin Criswell Chang, Bedford, MA (US); Jay William Anseth, Canton, MA (US); Ana L. Lattes, Newton, MA (US); Lynne A. McCullough, Brooklyn, NY (US)

(73) Assignee: E Ink Corporation, Billerica, MA (US)

(*) Notice: Subject to any disclaimer, the term of this patent is extended or adjusted under 35 U.S.C. 154(b) by 0 days.

(21) Appl. No.: 18/118,483

(22) Filed: Mar. 7, 2023

(65) Prior Publication Data

US 2023/0205037 A1 Jun. 29, 2023

Related U.S. Application Data

(62) Division of application No. 17/130,530, filed on Dec. 22, 2020, now Pat. No. 11,747,701.

(Continued)

(51) Int. Cl.
*G02F 1/16757* (2019.01)
*B01J 13/14* (2006.01)
(Continued)

(52) U.S. Cl.
CPC .......... *G02F 1/16757* (2019.01); *B01J 13/14* (2013.01); *G02F 1/167* (2013.01); *G02F 1/1676* (2019.01);
(Continued)

(58) Field of Classification Search
CPC .... G02F 1/167; G02F 1/16757; G02F 1/1676; G02F 2001/1678; G02F 2202/04;
(Continued)

(56) References Cited

U.S. PATENT DOCUMENTS 5,930,026 A 7/1999 Jacobson et al.
5,961,804 A 10/1999 Jacobson et al.
(Continued)

FOREIGN PATENT DOCUMENTS

CN 1506153 A 6/2004
CN 103834285 A 6/2014
(Continued)

OTHER PUBLICATIONS

Korean Intellectual Property Office, International Search Report & Written Opinion, PCT/US2020/066593, Apr. 15, 2021.
(Continued)

*Primary Examiner* — Brandi N Thomas
(74) *Attorney, Agent, or Firm* — Ioannis Constantinides

(57) ABSTRACT

A capsule comprising a capsule wall and an electrophoretic fluid encapsulated by the capsule wall. The capsule wall comprises a cross-linked nonionic, water-soluble or water-dispersible polymer. The electrophoretic fluid comprises a suspending fluid, first pigment particles, second pigment particles, and third pigment particles. In some embodiments, the electrophoretic fluid includes a fourth electrophoretic particle. The first, second, and third particles are electrically charged, suspended in the suspending fluid, and capable of moving through the suspending fluid upon application of an electric field to the capsule.

20 Claims, 10 Drawing Sheets

Related U.S. Application Data

(60) Provisional application No. 62/952,534, filed on Dec. 23, 2019.

(51) Int. Cl.
 *G02F 1/167* (2019.01)
 *G02F 1/1676* (2019.01)
 *G02F 1/1675* (2019.01)

(52) U.S. Cl.
 CPC .. *G02F 2001/1678* (2013.01); *G02F 2202/04* (2013.01)

(58) Field of Classification Search
 CPC .... G03C 1/0051; G03C 1/04; G03C 1/49809; G03C 1/49818; G03C 1/49863; G03C 1/49872; G03C 1/4989; G03C 1/7614; G03C 11/08; G03C 2001/7635; G03C 2200/36; G03C 5/17; G03C 1/49827; G03C 1/49845; G03C 2001/7425; G03C 2200/40; G03C 5/26; G03C 5/264; G03C 7/407; G03C 1/46; G03C 1/498; G03C 1/775; G03C 1/79; G03C 1/795; G03C 2001/03511; G03C 2005/3007; G03C 2200/35; G03C 2200/50
 See application file for complete search history.

(56) References Cited

U.S. PATENT DOCUMENTS

| | | |
|---|---|---|
| 6,017,584 A | 1/2000 | Albert et al. |
| 6,067,185 A | 5/2000 | Albert et al. |
| 6,120,588 A | 9/2000 | Jacobson |
| 6,120,839 A | 9/2000 | Comiskey et al. |
| 6,130,774 A | 10/2000 | Albert et al. |
| 6,172,798 B1 | 1/2001 | Albert et al. |
| 6,241,921 B1 | 6/2001 | Jacobson et al. |
| 6,249,271 B1 | 6/2001 | Albert et al. |
| 6,262,706 B1 | 7/2001 | Albert et al. |
| 6,262,833 B1 | 7/2001 | Loxley et al. |
| 6,300,932 B1 | 10/2001 | Albert |
| 6,323,989 B1 | 11/2001 | Jacobson et al. |
| 6,327,072 B1 | 12/2001 | Comiskey et al. |
| 6,377,387 B1 | 4/2002 | Duthaler et al. |
| 6,392,785 B1 | 5/2002 | Albert et al. |
| 6,392,786 B1 | 5/2002 | Albert |
| 6,459,418 B1 | 10/2002 | Comiskey et al. |
| 6,515,649 B1 | 2/2003 | Albert et al. |
| 6,538,801 B2 | 3/2003 | Jacobson et al. |
| 6,580,545 B2 | 6/2003 | Morrison et al. |
| 6,652,075 B2 | 11/2003 | Jacobson |
| 6,693,620 B1 | 2/2004 | Herb et al. |
| 6,721,083 B2 | 4/2004 | Jacobson et al. |
| 6,727,881 B1 | 4/2004 | Albert et al. |
| 6,822,782 B2 | 11/2004 | Honeyman et al. |
| 6,839,158 B2 | 1/2005 | Albert et al. |
| 6,866,760 B2 | 3/2005 | Paolini Jr. et al. |
| 6,870,661 B2 | 3/2005 | Pullen et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,982,178 B2 | 1/2006 | LeCain et al. |
| 6,987,603 B2 | 1/2006 | Paolini, Jr. et al. |
| 7,002,728 B2 | 2/2006 | Pullen et al. |
| 7,012,600 B2 | 3/2006 | Zehner et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,079,305 B2 | 7/2006 | Paolini, Jr. et al. |
| 7,109,968 B2 | 9/2006 | Albert et al. |
| 7,110,164 B2 | 9/2006 | Paolini, Jr. et al. |
| 7,116,318 B2 | 10/2006 | Amundson et al. |
| 7,130,107 B2 | 10/2006 | Liu et al. |
| 7,170,670 B2 | 1/2007 | Webber |
| 7,180,649 B2 | 2/2007 | Morrison et al. |
| 7,184,197 B2 | 2/2007 | Liang et al. |
| 7,202,991 B2 | 4/2007 | Zhang et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,242,513 B2 | 7/2007 | Albert et al. |
| 7,247,379 B2 | 7/2007 | Pullen et al. |
| 7,304,634 B2 | 12/2007 | Albert et al. |
| 7,312,784 B2 | 12/2007 | Baucom et al. |
| 7,312,916 B2 | 12/2007 | Pullen et al. |
| 7,339,715 B2 | 3/2008 | Webber et al. |
| 7,352,503 B2 | 4/2008 | Yang et al. |
| 7,375,875 B2 | 5/2008 | Whitesides et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,417,787 B2 | 8/2008 | Chopra et al. |
| 7,420,549 B2 | 9/2008 | Jacobson et al. |
| 7,433,114 B2 | 10/2008 | Van Brocklin et al. |
| 7,440,159 B2 | 10/2008 | Yang et al. |
| 7,453,445 B2 | 11/2008 | Amundson |
| 7,477,444 B2 | 1/2009 | Cao et al. |
| 7,532,388 B2 | 5/2009 | Whitesides et al. |
| 7,535,624 B2 | 5/2009 | Amundson et al. |
| 7,550,101 B2 | 6/2009 | Yang et al. |
| 7,561,324 B2 | 7/2009 | Duthaler et al. |
| 7,679,814 B2 | 3/2010 | Paolini, Jr. et al. |
| 7,746,544 B2 | 6/2010 | Comiskey et al. |
| 7,839,564 B2 | 11/2010 | Whitesides et al. |
| 7,848,006 B2 | 12/2010 | Wilcox et al. |
| 7,848,007 B2 | 12/2010 | Paolini, Jr. et al. |
| 7,903,319 B2 | 3/2011 | Honeyman et al. |
| 7,910,175 B2 | 3/2011 | Webber |
| 7,952,790 B2 | 5/2011 | Honeyman et al. |
| 7,955,532 B2 | 6/2011 | Liang et al. |
| 8,009,348 B2 | 8/2011 | Zehner et al. |
| 8,018,640 B2 | 9/2011 | Whitesides et al. |
| 8,035,886 B2 | 10/2011 | Jacobson |
| 8,115,729 B2 | 2/2012 | Danner et al. |
| 8,129,655 B2 | 3/2012 | Jacobson et al. |
| 8,174,755 B2 | 5/2012 | Yamamoto et al. |
| 8,199,395 B2 | 6/2012 | Whitesides et al. |
| 8,270,064 B2 | 9/2012 | Feick et al. |
| 8,305,341 B2 | 11/2012 | Arango et al. |
| 8,319,759 B2 | 11/2012 | Jacobson et al. |
| 8,390,918 B2 | 3/2013 | Wilcox et al. |
| 8,446,664 B2 | 5/2013 | Chen et al. |
| 8,582,196 B2 | 11/2013 | Walls et al. |
| 8,593,718 B2 | 11/2013 | Comiskey et al. |
| 8,687,265 B2 | 4/2014 | Ahn et al. |
| 8,717,664 B2 | 5/2014 | Wang et al. |
| 8,822,782 B1 | 9/2014 | Cunnyngham et al. |
| 9,005,494 B2 | 4/2015 | Valianatos et al. |
| 9,366,935 B2 | 6/2016 | Du et al. |
| 9,372,380 B2 | 6/2016 | Du et al. |
| 9,697,778 B2 | 7/2017 | Telfer et al. |
| 9,835,925 B1 | 12/2017 | Bull et al. |
| 9,921,451 B2 | 3/2018 | Telfer et al. |
| 10,372,008 B2 | 8/2019 | Telfer et al. |
| 10,983,410 B2 | 4/2021 | Widger et al. |
| 2005/0012980 A1 | 1/2005 | Wilcox et al. |
| 2005/0156340 A1 | 7/2005 | Valianatos et al. |
| 2006/0202949 A1* | 9/2006 | Danner .............. G02F 1/167 345/107 |
| 2006/0210711 A1* | 9/2006 | Hayashi .............. C09D 11/03 427/213.3 |
| 2007/0091417 A1 | 4/2007 | Cao et al. |
| 2007/0146310 A1* | 6/2007 | Paolini, Jr. ............. G02F 1/167 345/107 |
| 2008/0130092 A1 | 6/2008 | Whitesides et al. |
| 2009/0009852 A1 | 1/2009 | Honeyman et al. |
| 2009/0122389 A1 | 5/2009 | Whitesides et al. |
| 2009/0206499 A1 | 8/2009 | Whitesides |
| 2009/0225398 A1 | 9/2009 | Duthaler et al. |
| 2010/0148385 A1 | 6/2010 | Balko et al. |

(56) References Cited

U.S. PATENT DOCUMENTS

2011/0286081 A1 11/2011 Jacobson
2014/0011913 A1 1/2014 Du et al.
2019/0270064 A1 9/2019 Postma et al.

FOREIGN PATENT DOCUMENTS

| GB | 1006284 A | 9/1965 |
| JP | 2003330179 A | 11/2003 |
| KR | 20100065552 A | 6/2010 |
| KR | 20130078094 A | 7/2013 |

OTHER PUBLICATIONS

European Patent Office; "Extended European Patent Office"; EP Appl. No. 20907398.0; May 7, 2024.

\* cited by examiner

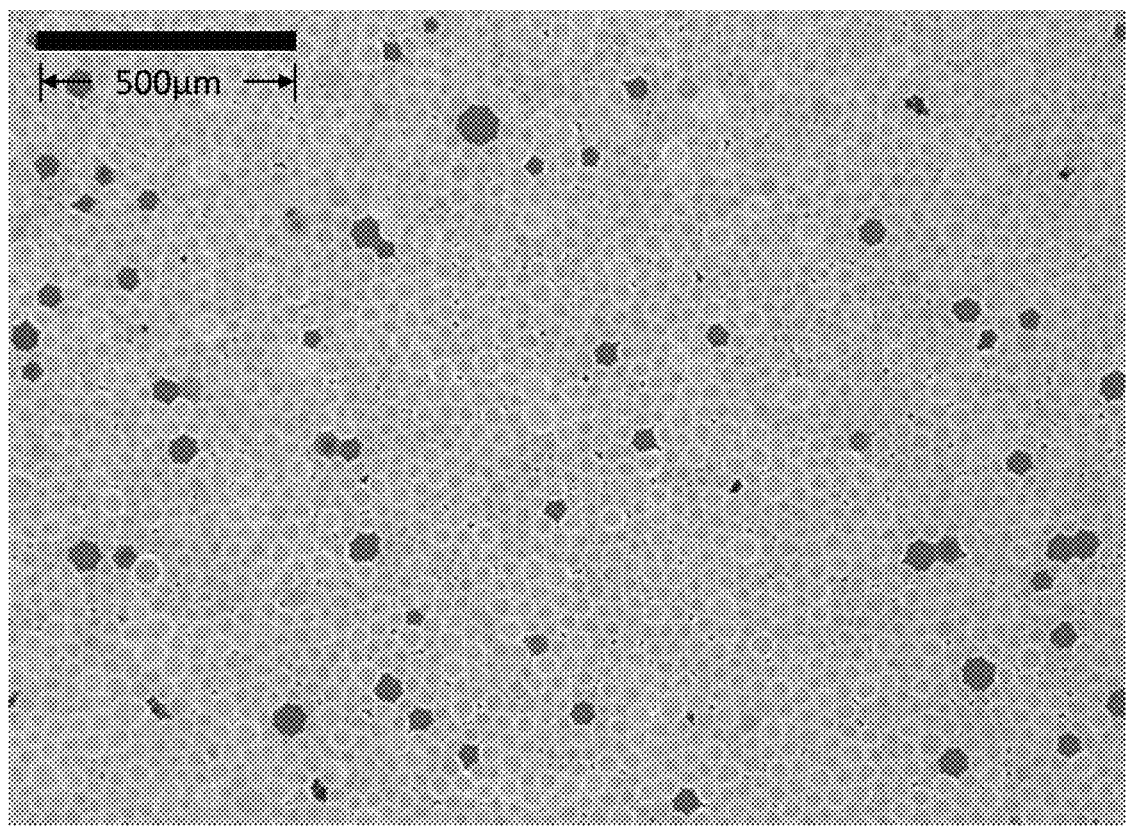
FIG. 5A (above)
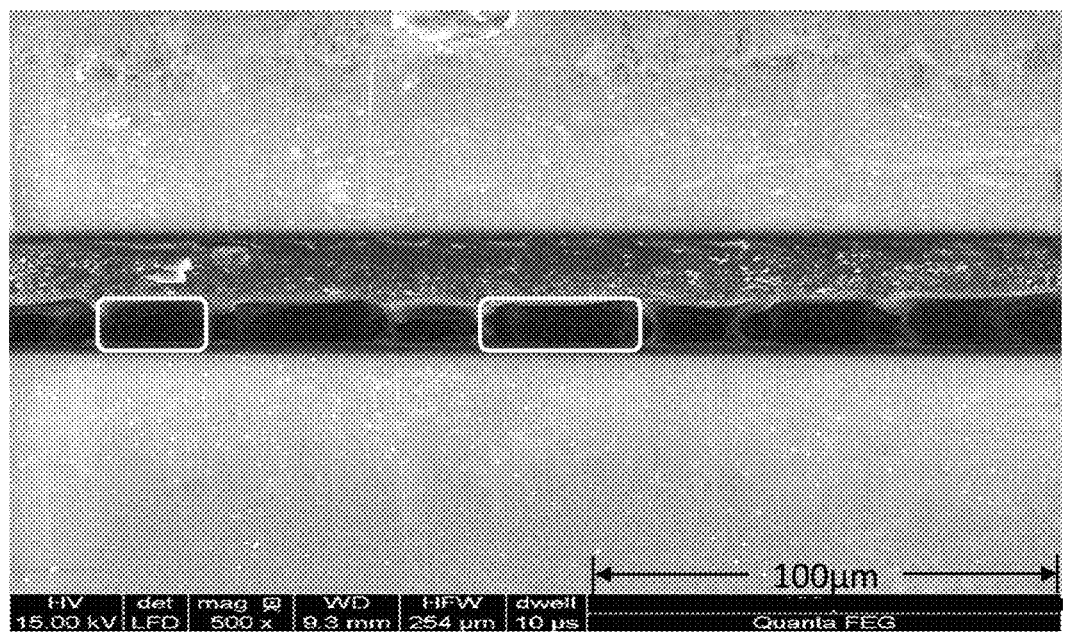
FIG. 5B (cross-section)

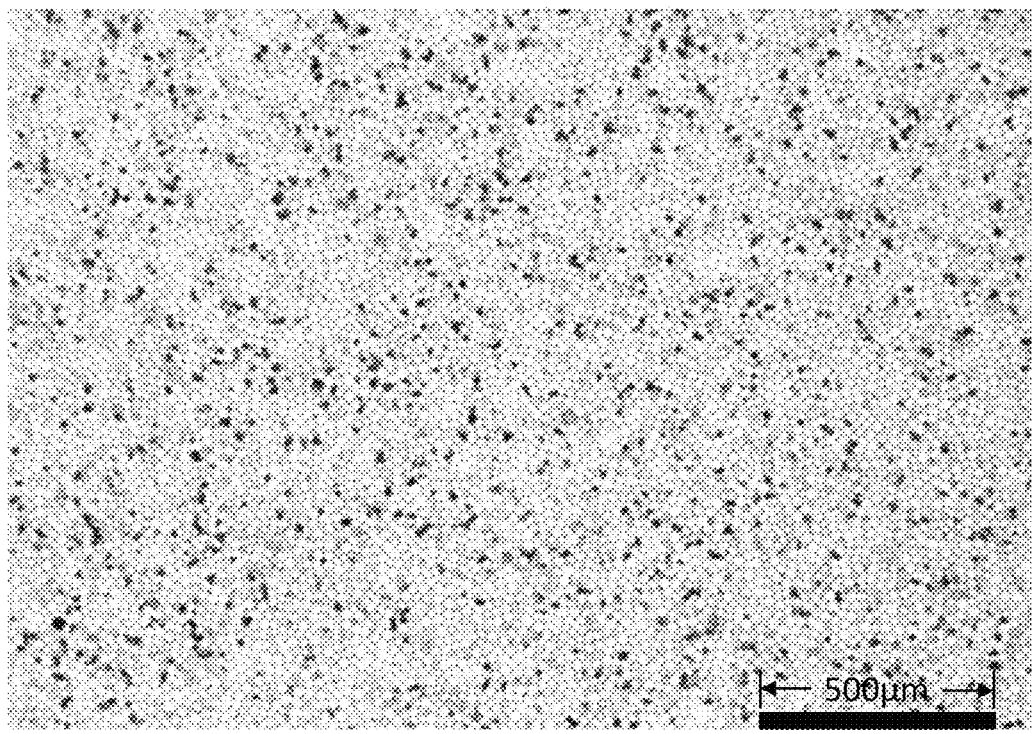
FIG. 8A (above)
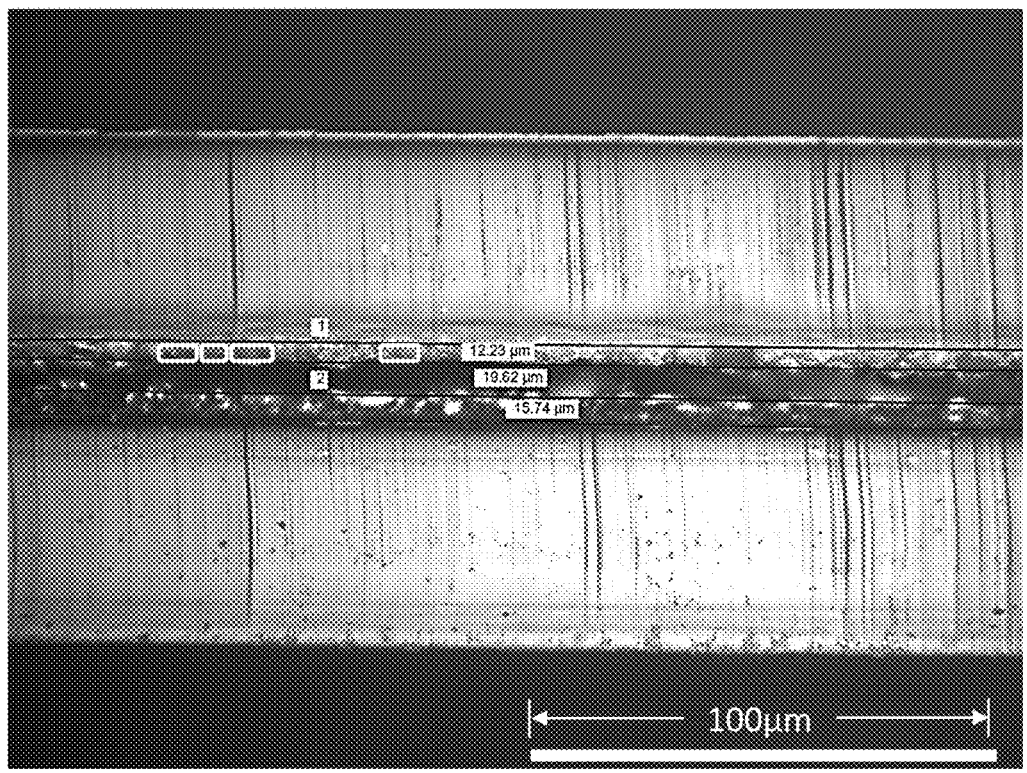
FIG. 8B (cross-section)

COLOR ELECTROPHORETIC LAYER INCLUDING MICROCAPSULES WITH NONIONIC POLYMERIC WALLS

CROSS-REFERENCE TO RELATED APPLICATIONS

This application is a divisional application of U.S. patent application Ser. No. 17/130,530, filed on Dec. 22, 2020 (Publication No. 2021/0191226 A1), which claims priority to provisional Application Ser. No. 62/952,534, filed on Dec. 23, 2019. All references, patents, and patent applications disclosed herein are incorporated by reference in their entireties.

BACKGROUND OF THE INVENTION

Traditional electrophoretic displays based on microencapsulated pigments, e.g., found in most eReaders, use a coacervate of gelatin and acacia to form the microcapsule walls. For black and white displays this material has been shown to provide excellent performance and such capsules are relatively easy to manufacture. More complex, three-color and four-color electrophoretic systems have been developed in which the pigments are enclosed within microcells, rather than microcapsules. (The methods for forming, filling, and sealing such microcells has been described in numerous patents and patent applications held by E Ink Corporation.) For large-area display applications, however, it might be preferable to have the option of a microcapsule architecture, since the maximum size of an embossed microcell area may be limited by the diameter of the embossing drum in certain embodiments.

It would be useful to have devices comprising microcapsules containing three or more pigments such that the same electrophoretic fluid(s) would produce optical states similar to those obtained in microcell compartments, or in liquid test cells (e.g., test pixels), with only minor adjustments to the addressing waveforms being required. This has typically not been possible using the gelatin/acacia capsule walls.

In this regard, there is a long and rich history to encapsulation, with numerous processes and polymers having been proposed as materials for electrophoretic capsules. For example, U.S. Published Pat. Appl. No. 2006/0245038 suggests a great number of possible substances, including gelatin, polyvinyl alcohol, polyvinyl acetate, and cellulosic derivatives, as materials for manufacturing the capsule walls via coacervation processes. However, no guidance is provided as to the possible effects of capsule wall materials on the functioning of an enclosed electrophoretic fluid.

In this regard, there is a long and rich history to encapsulation, with numerous processes and polymers having been proposed as materials for electrophoretic capsules. For example, U.S. Published Pat. Appl. No. 2006/0245038 suggests a great number of possible substances, including gelatin, polyvinyl alcohol, polyvinyl acetate, and cellulosic derivatives, as materials for manufacturing the capsule walls via coacervation processes. However, no guidance is provided as to the possible effects of capsule wall materials on the functioning of an enclosed electrophoretic fluid.

SUMMARY

In a first aspect, there is provided a capsule for electrophoretic media. The capsule includes a capsule wall and an electrophoretic fluid encapsulated by the capsule wall. Specifically, the capsule includes a capsule wall including a nonionic polymer that is water-soluble (or water-dispersible) and cross-linked, while the electrophoretic fluid comprises a suspending solvent, first pigment particles, second pigment particles, and third pigment particles, wherein the first, second, and third particles are differently colored, electrically charged, suspended in the suspending fluid, and capable of moving through the suspending fluid upon application of an electric field to the capsule. In some embodiments, the nonionic polymer is a polyol. n some embodiments, wherein the polyol is polyvinyl alcohol. In some embodiments, the capsule wall comprises a cured coacervation layer formed from the nonionic polymer and a polyvinyl lactam, which is optionally polyvinylpyrrolidone. In some embodiments, the capsule wall is cross-linked by reaction with a dialdehyde, which is optionally glutaraldehyde. In some embodiments, the suspending solvent comprises a hydrocarbon, such as a mixture of hydrocarbons, such as ISOPAR® E, available from Sigma-Aldrich. In some embodiments, one or more of the pigment particles are reflective. In some embodiments, one or more of the pigment particles are absorptive. In some embodiments, the electrophoretic fluid further comprises a fourth pigment particle. In some embodiments, the electrophoretic fluid includes a white pigment, a yellow pigment, a magenta pigment, and a cyan pigment. In some embodiments, the electrophoretic fluid includes a white pigment, a black pigment, a yellow pigment, and a red pigment. In some embodiments, the electrophoretic fluid includes a black pigment, a red pigment, a yellow pigment, and a blue pigment. In some embodiments. Capsules of the invention may be included in an electrophoretic medium further including a binder surrounding the capsules. In some embodiments the capsules have an average diameter between 15 μm and 50 μm, and less than one third of the capsules (by number) are smaller than 15 μm or larger than 50 μm. Such an electrophoretic medium, may in turn, be incorporated into an electrophoretic display including at least one electrode disposed adjacent the electrophoretic medium and arranged to apply an electric field to the electrophoretic medium. The electrophoretic display may be rectangular in shape and have a diagonal measurement of more than 30 cm, e.g., more than 50 cm. An electrophoretic display may additionally include, a second electrode or electrode layer, which may include an array of pixel electrodes controlled with thin-film-transistors. In some embodiments, one or more of the electrodes may be light transmissive.

SUMMARY OF THE INVENTION

In a first aspect, there is provided a capsule for electrophoretic media. The capsule includes a capsule wall and an electrophoretic fluid encapsulated by the capsule wall. Specifically, the capsule includes a capsule wall including a nonionic polymer that is water-soluble (or water-dispersible) and cross-linked, while the electrophoretic fluid comprises a suspending solvent, first pigment particles, second pigment particles, and third pigment particles, wherein the first, second, and third particles are differently colored, electrically charged, suspended in the suspending fluid, and capable of moving through the suspending fluid upon application of an electric field to the capsule. In some embodiments, the nonionic polymer is a polyol. n some embodiments, wherein the polyol is polyvinyl alcohol. In some embodiments, the capsule wall comprises a cured coacervation layer formed from the nonionic polymer and a polyvinyl lactam, which is optionally polyvinylpyrrolidone.

In some embodiments, the capsule wall is cross-linked by reaction with a dialdehyde, which is optionally glutaraldehyde. In some embodiments, the suspending solvent comprises a hydrocarbon, such as a mixture of hydrocarbons, such as ISOPAR® E, available from Sigma-Aldrich. In some embodiments, one or more of the pigment particles are reflective. In some embodiments, one or more of the pigment particles are absorptive. In some embodiments, the electrophoretic fluid further comprises a fourth pigment particle. In some embodiments, the electrophoretic fluid includes a white pigment, a yellow pigment, a magenta pigment, and a cyan pigment. In some embodiments, the electrophoretic fluid includes a white pigment, a black pigment, a yellow pigment, and a red pigment. In some embodiments, the electrophoretic fluid includes a black pigment, a red pigment, a yellow pigment, and a blue pigment. In some embodiments. Capsules of the invention may be included in an electrophoretic medium further including a binder surrounding the capsules. In some embodiments the capsules have an average diameter between 15 μm and 50 μm, and less than one third of the capsules (by number) are smaller than 15 μm or larger than 50 μm. Such an electrophoretic medium, may in turn, be incorporated into an electrophoretic display including at least one electrode disposed adjacent the electrophoretic medium and arranged to apply an electric field to the electrophoretic medium. The electrophoretic display may be rectangular in shape and have a diagonal measurement of more than 30 cm, e.g., more than 50 cm. An electrophoretic display may additionally include, a second electrode or electrode layer, which may include an array of pixel electrodes controlled with thin-film-transistors. In some embodiments, one or more of the electrodes may be light transmissive.

In a second aspect, there is provided a method for producing capsules of the invention. The method includes providing a polymer solution comprising a nonionic, water-soluble or water-dispersible starting polymer in an aqueous solvent, providing an electrophoretic fluid comprising a suspending solvent and pigment particles, mixing the polymer solution and the electrophoretic fluid to create a reaction mixture, heating the reaction mixture to a temperature above the lowest critical solution temperature of the polymer solution, thereby forming an oil-in-water emulsion including the electrophoretic fluid. adding a cross-linking agent to the oil-in-water emulsion, thereby forming a curing mixture; and heating the curing mixture to form capsules encapsulating an electrophoretic medium. In some embodiments, the polymer solution comprises a polyvinyl alcohol. In some embodiments, the polymer solution comprises a copolymer of vinyl acetate. In some embodiments, the method further comprises adding a second nonionic, water-soluble or water-dispersible starting polymer to the polymer solution. In some embodiments, the second nonionic polymer is polyvinylpyrrolidone. In some embodiments, the cross-linking agent is a glutaraldehyde. In some embodiments, the method additionally includes adding a coacervation inducer to the polymer solution. In some embodiments, the coacervation inducer is a water-soluble (or water-dispersible) salt. In some embodiments, the salt is a sulfate, such as sodium sulfate.

BRIEF DESCRIPTION OF DRAWINGS

FIG. 5A shows a micrograph of a dried coating made with the capsules of FIG. 4B, dispersed in a polyurethane binder, and incorporated into a test pixel. FIG. 5B shows a scanning electron microscope (SEM) cross-section of the coating of FIG. 5A.

FIG. 8A shows a micrograph of a dried coating made with non-ionic polymer microcapsules sieved at 15 μm and incorporated into a test pixel. FIG. 8B shows a scanning electron microscope (SEM) cross-section of the coating of FIG. 8A.

DETAILED DESCRIPTION OF THE INVENTION

In a first aspect, the present invention relates to novel electro-optic media based on electrophoretic fluids enclosed within microcapsules based on nonionic polymers. Such nonionic polymer capsules are in contrast to traditional polymer capsules bearing ionizable groups, such as are present in capsules of gelatin and acacia. The capsules disclosed herein are typically formed from a coacervate of nonionic polymer(s) that engulf an internal phase comprising a mixture of a non-polar solvent and more than two types of charged pigment particles. Surprisingly, it has been found that the microcapsules provide approximately the same (or better) electro-optical performance when compared to test cells or microcells incorporating the same fluids when addressed with the same waveforms. In other words, the process of encapsulation does not make a drastic change to the mechanism of pigment motion induced by electrical addressing of the display. Such "drop in" capability means that encapsulated media of the invention can be used with existing infrastructure, such as backplanes and drivers.

Without being bound to any particular theory, it appears that nonionic microcapsule walls may be less likely to interfere with the charge balance that must be maintained within the electrophoretic fluid, especially when complex outcomes are expected, as is the case in multicolor displays. Accordingly, the electro-optic media can be coated over large surfaces and laminated with electrodes and/or other layers, to create a variety of electro-optic devices, including sunlight-readable displays and smart windows.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

Figure 1A:
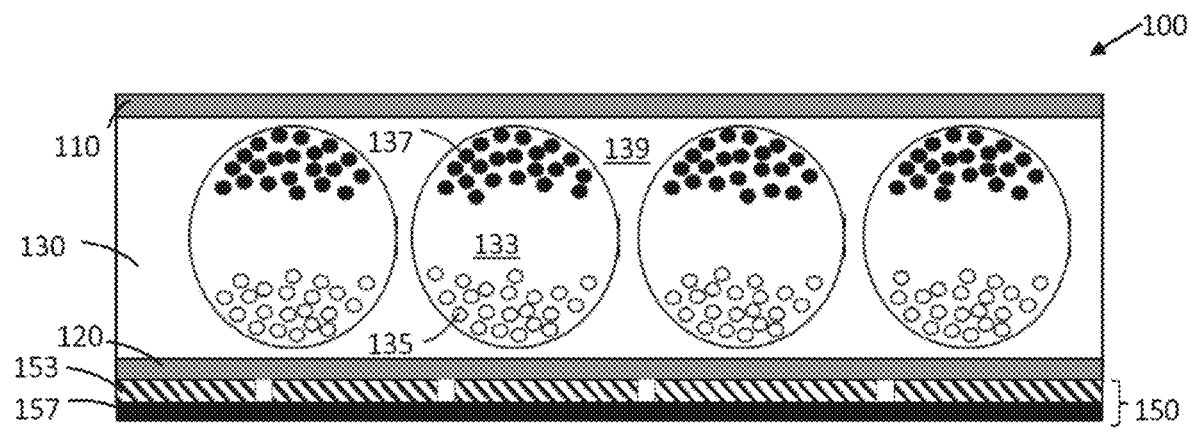
FIG. 1A is a schematic depiction of a typical encapsulated electrophoretic display.
Figure 1B:
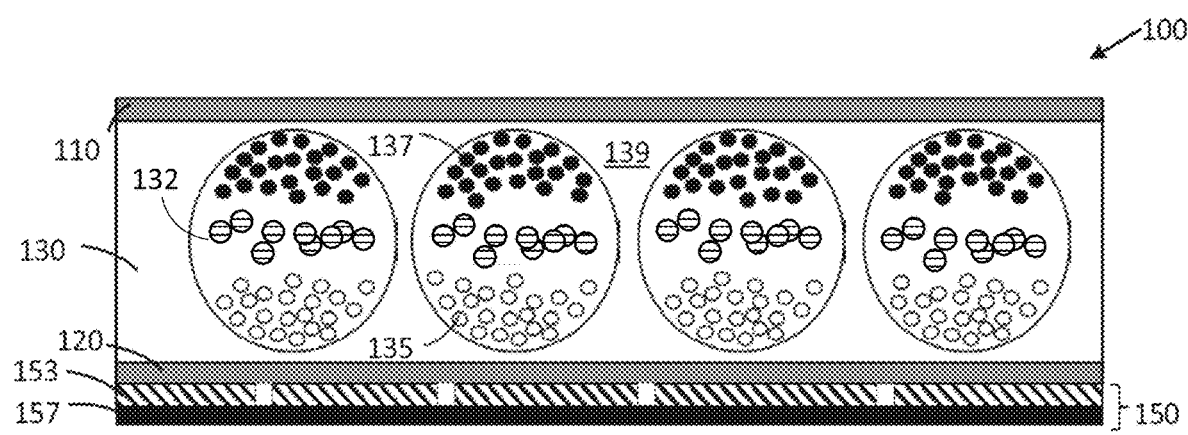
FIG. 1B is a schematic depiction of an exemplary encapsulated electrophoretic display including three different types of charged pigment particles.

A traditional microcapsule-based electrophoretic display (EPID) is shown in FIG. 1A. Display 100 normally comprises a layer of electrophoretic material 130 and at least two other layers 110 and 120 disposed on opposed sides of the electrophoretic material 130, at least one of these two layers being an electrode layer, e.g., as depicted by layer 110 in FIG. 1A. The front electrode 110 may represent the viewing side of the display 100, in which case the front electrode 110 may be a transparent conductor, such as Indium Tin Oxide (ITO) (which in some cases may be deposited onto a transparent substrate, such as polyethylene terephthalate (PET)). Other flexible conductive materials such as conductive polymers or polymers with conductive additives may be used for the front electrode. Such EPIDs also include, as illustrated in FIG. 1A, a backplane 150, comprising a plurality of driving electrodes 153 and a substrate layer 157. The layer of electrophoretic material 130 may include microcapsules 133, holding electrophoretic pigment white particles 135, black particles 137, and a solvent, with the microcapsules 133 dispersed in a polymeric binder 139. Typically, the pigment particles 137 and 135 are controlled (displaced) with an electric field produced between the front electrode 110 and the pixel electrodes 153. In many conventional EPIDs the electrical driving waveforms are transmitted to the pixel electrodes 153 via conductive traces (not shown) that are coupled to thin-film transistors (TFTs) that allow the pixel electrodes to be addressed in a row-column addressing scheme. In some embodiments, the front electrode 110 is merely grounded and the image driven by providing positive and negative potentials to the pixel electrodes 153, which are individually addressable. In other embodiments, a potential may also be applied to the front electrode 110 to provide a greater variation in the fields that can be provided between the front electrode and the pixel electrodes 153. In some embodiments, a third (red particle) 132 may be included in the electrophoretic display, as shown in FIG. 1B.

Figure 2:
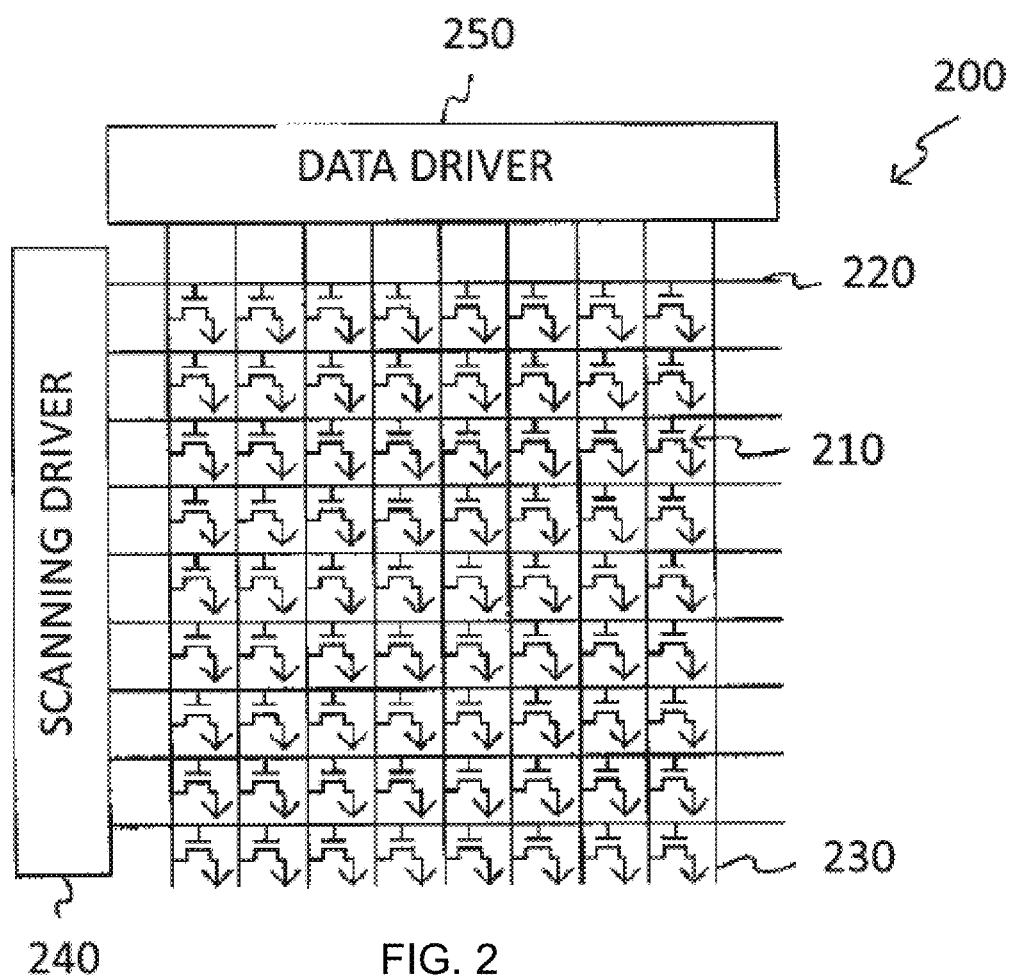
FIG. 2 is a schematic depiction of a thin-film transistor (TFT) array to control pixel electrodes and the associated scan (gate) and data (source) drivers.

In many embodiments, the TFT array forms an active matrix for image driving, as shown in FIG. 2. For example, each pixel electrode (153 in FIG. 1A) is coupled to a thin-film transistor 210 patterned into an array, and connected to elongate row electrodes 220 and elongate column electrodes 230, running at right angles to the row electrodes 220. In some embodiments, the pixels comprise transistors fabricated from metal oxides. In some embodiments, the pixels comprise transistors formed from doped polymers. In some embodiments, one electrode layer has the form of a single continuous electrode and the other electrode layer is patterned into a matrix of pixel electrodes, each of which defines one pixel of the display. As shown in FIG. 2, the data (source) driver 250 is connected to the column electrodes 230 and provides source voltage to all TFTs in a column that are to be addressed. The scan (gate) driver 240 is connected to the row electrodes 220 to provide a bias voltage that will open (or close) the gates of each TFT along the row. Of course, the location of the data and source drivers is arbitrary and they can be interchanged from the position shown in FIG. 2. The gate scanning rate is typically ~60-100 Hz, however faster or slower scanning may be appropriate in some instances.

Typically, taking the gate-source voltage positive allows the source voltage to be shorted to the drain. Taking the gate negative with respect to the source causes the drain source currents to drop and the drain effectively floats. Because the scan driver acts in a sequential fashion, there is typically some measurable delay in update time between the top and bottom row electrodes. It is understood that the assignment of "row" and "column" electrodes is somewhat arbitrary and that a TFT array could be fabricated with the roles of the row and column electrodes interchanged. In some embodiments, the TFT array is substantially flexible, however individual components, such as individual pixel transistors or driver circuits may not be flexible. The flexible traces for supply voltages to the individual pixels may be formed from flexible materials, such as conductive polymers, or polymers doped with conductive materials such as metal particles, nanoparticles, nanowires, nanotubes, graphite, and graphene. In some embodiments, the TFTs can be fabricated from organic thin film transistors.

While traditional EPID media are described as "black/white," they are typically driven to a plurality of different states between black and white to achieve various tones or "greyscale." Additionally, a given pixel may be driven between first and second grayscale states (which include the endpoints of white and black) by driving the pixel through a transition from an initial gray level to a final gray level (which may or may not be different from the initial gray level). The term "waveform" will be used to denote the entire voltage against time curve used to effect the transition from one specific initial gray level to a specific final gray level. Typically, such a waveform will comprise a plurality of waveform elements; where these elements are essentially rectangular (i.e., where a given element comprises application of a constant voltage for a period of time); the elements may be called "pulses" or "drive pulses."

The term "gray state" is used herein in its conventional meaning in the imaging art to refer to a state intermediate two extreme optical states of a pixel, and does not necessarily imply a black-white transition between these two extreme states. For example, it is known to use electro-optic displays as variable transmission windows in which the extreme states are substantially transparent and essentially opaque, so that an intermediate "gray state" would be partially transmissive but may not actually be gray in color. Indeed, if the particles used are light-scattering, a partially transmissive "gray state" may actually be colored white. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Some of the materials and techniques described in the patents and applications listed below are relevant to fabricating variable transmission devices described herein, including:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,870,661; 7,002,728; 7,038,655; 7,170,670; 7,180,649; 7,230,750; 7,230,751; 7,236,290; 7,247,379; 7,312,916; 7,375,875; 7,411,720; 7,532,388; 7,679,814; 7,746,544; 7,848,006; 7,903,319; 8,018,640; 8,115,729; 8,199,395; 8,270,064; and 8,305,341; and U.S. Patent Applications Publication Nos. 2005/0012980; 2008/0266245; 2009/0009852; 2009/0206499; 2009/0225398; 2010/0148385; 2010/0207073; and 2011/0012825;

(b) Capsules, binders and encapsulation processes; see for example see for example U.S. Pat. Nos. 5,930,026; 6,067,185; 6,130,774; 6,172,798; 6,249,271; 6,327,072; 6,392,785; 6,392,786; 6,459,418; 6,839,158; 6,866,760; 6,922,276; 6,958,848; 6,987,603; 7,061,663; 7,071,913; 7,079,305; 7,109,968; 7,110,164; 7,184,197; 7,202,991; 7,242,513; 7,304,634; 7,339,715; 7,391,555; 7,411,719; 7,477,444; 7,561,324; 7,848,007; 7,910,175; 7,952,790; 7,955,532; 8,035,886; 8,129,655; 8,446,664; and 9,005,494; and U.S. Patent Applications Publication Nos. 2005/0156340; 2007/0091417; 2008/0130092; 2009/0122389; and 2011/0286081;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 7,075,502 and 7,839,564;

(f) Methods for driving displays; see for example U.S. Pat. Nos. 7,012,600 and 7,453,445;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Electrophoretic Fluids

The internal phase of the electro-optic medium includes charged pigment particles which are dispersed in a suspending solvent. In exemplary embodiments, the solvent in which the three types of pigment particles are dispersed is clear and colorless and may be either one or a combination of two or more liquids. It preferably has a low viscosity and a dielectric constant in the range of about 2 to about 30, preferably about 2 to about 15 for high particle mobility. Examples of suitable dielectric solvent include hydrocarbons such as ISOPAR® (Sigma-Aldrich), decahydronaphthalene (DECALIN), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane, pentachlorobenzene; and perfluorinated solvents such as FC-43, FC-70 and FC-5060 from (3M Company, St. Paul, MN), low molecular weight halogen containing polymers such as poly(perfluoropropylene oxide) (TCI America, Portland, OR), poly(chlorotrifluoro-ethylene) such as Halocarbon Oils (Halocarbon Product Corp., River Edge, NJ), perfluoropolyalkylether such as Galden (Ausimont USA, Thorofare, NJ) or Krytox Oils and Greases K-Fluid Series (DuPont, Wilmington, DE), polydimethylsiloxane based silicone oils such as DC-200 (Dow Corning, Midland, MI).

The index of refraction of the internal phase may be modified with the addition of index matching agents such as Cargille® index matching fluids available from Cargille-Sacher Laboratories Inc. (Cedar Grove, NJ).

Colored Pigment Particles

Charged pigment particles may be of a variety of colors and compositions. Additionally, the charged pigment particles may be functionalized with surface polymers to improve state stability. Such pigments are described in U.S. Pat. No. 9,921,451, which is incorporated by reference in its entirety. As anticipated above, an electrophoretic fluid forming the internal phase of the microcapsules includes three or more types of charged pigment particles dispersed in the suspending solvent. For ease of illustration, the three types of pigment particles may be referred to as white particles, black particles and colored particles. This configuration is exemplified in FIG. 1B, where red particles 132 are present in addition to traditional white particles 135 and black particles 137. However, it is understood that the scope of the invention broadly encompasses pigment particles of any colors as long as the three types of pigment particles have visually contrasting colors. For example, the electrophoretic fluid may include a particle set of a reflective white particle, and cyan, yellow, and magenta absorptive particles. Alternatively, the electrophoretic fluid may include a particle set of an absorptive black particle, and red, yellow, and blue reflective particles.

For example, if the charged particles are of a white color, they may be formed from an inorganic pigment such as $TiO_2$, $ZrO_2$, $ZnO$, $Al_2O_3$, $Sb_2O_3$, $BaSO_4$, $PbSO_4$ or the like. They may also be polymer particles with a high refractive index (>1.5) and of a certain size (>100 nm) to exhibit a white color, or composite particles engineered to have a desired index of refraction. With regard to black charged particles, they may be formed from CI pigment black 26 or 28 or the like (e.g., manganese ferrite black spinel or copper chromite black spinel) or carbon black. The third type of pigment particles may be of a color such as red, green, blue, magenta, cyan, or yellow. The pigments for this type of particles may include, but are not limited to, C.I. pigment PR 254, PR122, PR149, PG36, PG58, PG7, PB28, PB15:3, PY138, PY150, PY155 or PY20. Those are commonly used organic pigments described in color index handbook "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

The percentages of the three types of pigment particles in the electrophoretic fluid may vary. For example, the black particles may take up about 0.1% to 10%, preferably 0.5% to 5% by volume of the electrophoretic fluid; the white particles may take up about 1% to 50%, preferably 5% to 15% by volume of the fluid; and the colored particles may take up 2% to 20%, preferably 4% to 10% by volume of the fluid. There may be other particulate matters in the fluid which are included as additives to enhance performance of the display device, such as switching speed, imaging bistability and reliability.

In representative embodiments, two of the three types of pigment particles carry opposite charge polarities and the third type of pigment particles is slightly charged. The term "slightly charged" is defined as the third type bearing a fraction of the charge carried by the greater charged of the first two types of particles. For example, if the black particles are positively charged and the white particles are negatively charged, then the colored pigment particles are slightly charged. In other words, the charge carried by the black and the white particles is much more intense than the charge carried by the colored particles. In example embodiments, the colored pigment particles carry less than 75%, less than 50%, less than 40%, or less than 30% of the charge carried by the greater charged of the white and black particles. Typically, the amount of charge of the "slightly charged" particles is between half and a third of the greater charged particles. In addition, the third type of particles which carries a slight charge has a charge polarity which is the same as the charge polarity carried by either one of the other two types of the stronger charged particles.

The surface of the charged particles may be modified by known techniques based on the charge polarity and charge level of the particles required, as described in U.S. Pat. Nos. 6,822,782, 7,002,728, 9,366,935, and 9,372,380 as well as US Publication No. 2014-0011913. The particles may exhibit a native charge, or may be charged explicitly using a charge control agent, or may acquire a charge when suspended in a solvent. Suitable charge control agents are well known in the art; they may be polymeric or non-polymeric in nature or may be ionic or nonionic. Examples of charge control agent may include, but are not limited to, Solsperse 17000 (active polymeric dispersant), Solsperse 9000 (active polymeric dispersant), OLOA 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate), Aerosol OT, polyisobutylene derivatives or poly(ethylene co-butylene) derivatives, and the like. In addition to the suspending solvent and charged pigment particles, internal phases may include stabilizers, surfactants and charge control agents. A stabilizing material may be adsorbed on the charged pigment particles when they are dispersed in the solvent. This stabilizing material keeps the particles separated from one another so that the variable transmission medium is substantially non-transmissive when the particles are in their dispersed state.

As is known in the art, dispersing charged particles (typically a carbon black, as described above) in a solvent of low dielectric constant may be assisted by the use of a surfactant. Such a surfactant typically comprises a polar "head group" and a non-polar "tail group" that is compatible with or soluble in the solvent. In the present invention, it is preferred that the non-polar tail group be a saturated or unsaturated hydrocarbon moiety, or another group that is soluble in hydrocarbon solvents, such as for example a poly(dialkylsiloxane). The polar group may be any polar organic functionality, including ionic materials such as ammonium, sulfonate or phosphonate salts, or acidic or basic groups. Particularly preferred head groups are carboxylic acid or carboxylate groups. Stabilizers suitable for use with the invention include polyisobutylene and polystyrene. In some embodiments, dispersants, such as polyisobutylene succinimide and/or sorbitan trioleate, and/or 2-hexyldecanoic acid are added.

The three types of pigment particles may have varying sizes. In one embodiment, one of the three types of pigment particles is larger than the other two types. It is noted that among the three types of pigment particles, the one type of particles which is slightly charged preferably has the larger size. For example, both the black and the white particles are relatively small and their sizes (tested through dynamic light scattering) may range from about 50 nm to about 800 nm, and more preferably from about 200 nm to about 700 nm, and in this example embodiment, the colored particles which are slightly charged, preferably are about 2 to about 50 times and more preferably about 2 to about 10 times larger than the black particles and the white particles.

The term "threshold voltage", in the context of the present invention, is defined as the maximum bias voltage that may be applied to a group of pigment particles, without causing the pigment particles to appear at the viewing side of the display device. The term "viewing side" refers to a side of a display device where images are seen by the viewers. In one aspect of the present application, at least one of the three types of pigment particles may demonstrate a threshold voltage under triangle voltage driving testing. The threshold voltage is either an inherent characteristic of the charged pigment particles or an additive-induced property. In the former case, the threshold is generated, relying on certain attraction force between particles or between particles and certain substrate surfaces. A threshold may also be generated via interaction of two types of oppositely charged particles. In the latter case referred to above, to achieve a threshold voltage, a threshold agent which induces or enhances the threshold characteristics of an electrophoretic fluid may be added. The threshold agent may be any material which is soluble or dispersible in the solvent of the electrophoretic fluid and carries or induces a charge opposite to that of the charged pigment particles. The threshold agent may be sensitive or insensitive to the change of applied voltage. The term "threshold agent" may broadly include dyes or pigments, electrolytes or polyelectrolytes, polymers, oligomers, surfactants, charge controlling agents and the like. Additional information relating to the threshold agent may be found in U.S. Pat. No. 8,115,729.

Capsule Materials

In one aspect of the present invention, the nonionic capsule walls are made from one or more starting homopolymers or copolymers that are water-soluble or water-dispersible and nonionic in pH-neutral aqueous solutions. In one embodiment, the starting polymer bears essentially no electrical charge in aqueous solutions having a pH in the range of about 2 to 12. In other, non-exclusive embodiments, the starting polymer bears essentially no electrical charge in aqueous solutions having a pH in the range of about 3 to 11, 4 to 10, 5 to 9, or 6 to 8. Optionally, or alternatively, the starting polymer bears essentially no electrical charges at the operating conditions of electrophoretic media in which the capsules are to be incorporated. In preferred embodiments, at least one of the nonionic wall polymers features three or more functional groups capable of forming covalent bonds with cross-linking agents, to strengthen the capsule walls. Typical functional groups include alcoholic hydroxyl (—OH) moieties bonded to saturated carbons that are either part of the polymeric chain or connected thereto via a bridging moiety.

It is to be understood that the starting polymer may in some instances include a minor number of electrically charged functional groups, provided that the number of charges does not substantially degrade the performance of the capsules. For example, the starting polymer may be a polyol containing carboxylic or amino moieties that are ionized at the pH of the electrophoretic medium, but the number of ionizable functional group is too small to adversely affect the properties of the nonionic capsules in the manner seen, for example, for gelatin/acacia capsules. In some instances, the starting polymer may include functional groups which, although bearing a charge at certain pH ranges, give rise to neutral moieties once incorporated in the capsule walls, emphasis being placed on the neutrality of this feature within the final product. Typical functional groups of this type include carboxylates that are incorporated into ester moieties and amino groups that become part of amide or carbamate moieties within the final product capsule walls.

In this specification, unless stated otherwise, the term "polymer" includes molecules composed of at least 50 repeated subunits, for instance polyvinyl lactams such as polyvinylpyrrolidone (PVP), hydrophilic polyethers such as polyethylene glycol (PEG), polyethylene oxide-polypropylene oxide (PEO-PPO), polyethylene oxide-polypropylene oxide-polyethylene oxide (PEO-PPO-PEO), vinylpyrrolidone-vinyl acetate copolymers, polysaccharides and water-soluble polysiloxanes.

Typical polyhydroxyl polymers, also known as polyols, include those having a 1,2- and/or 1,3-diol structure, such as polyvinyl alcohols (PVOH) having the formula $(CH_2CHOH)_n$, i.e., having n alcohol groups where n can be in the hundreds or even thousands, depending on the molecular weight of the PVOH. In instances where the PVOH is prepared by hydrolysis of the corresponding homopolymeric polyvinyl acetate, the PVOH may include less than 50% of polyvinyl acetate units, in particular less than 20% of polyvinyl acetate units. In certain embodiments, the polyvinyl alcohols can also contain small proportions, for example of up to 20%, or alternatively up to 10% or up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar comonomers typically used. It is also possible to use copolymers of hydrolysed or partially hydrolysed vinyl acetate, which are obtainable, for example, as hydrolysed ethylene-vinyl acetate (EVA), or vinyl chloride-vinyl acetate, N-vinylpyrrolidone-vinyl acetate and maleic anhydride-vinyl acetate. Polysaccharides provide another class of preferred polyols, for example ethyl cellulose, hydroxypropyl methyl cellulose, guar gum, dextrin, starch and other related materials such as are well known in the art.

Preferably, the mean molecular weight of the starting polymer(s) is at least about 10,000 Daltons. The upper limit to their mean molecular weight may be up to 25,000 Daltons, 50,000 Daltons, or 75,000 Daltons, although upper limits of 100,000 Daltons or higher are also contemplated.

Cross-linking agents capable of reacting and forming covalent bonds with the hydroxyl groups of a polyol starting polymer include molecules bearing two or more reactive carbonyl groups, such as saturated dialdehydes of 2 to 6 carbons. Reaction between the alcohol groups of the polyol and the carbonyl moieties of the dialdehyde forms cross-linkages reinforcing the structure of the microcapsule. Other possible crosslinkers include organic titanates or zirconates and boric acid. It is also possible to stabilize the polymer by steps of heating and cooling that may induce physical crosslinking, for example, by means of entanglement or hydrogen bonding. Configurations where the starting polymer features reactive groups other than hydroxyl are also contemplated, provided that the cross-linking agent include moieties capable of reacting with such groups to form covalent linkages.

Encapsulating the Electrophoretic Fluid

In a further aspect, there is provided a method for encapsulating an electrophoretic fluid by depositing one or more nonionic, water-soluble or water-dispersible starting polymers onto emulsified droplets of the electrophoretic fluid using a process of coacervation, also called phase separation. Coacervation involves the separation of a liquid phase of coating material from a polymeric solution and wrapping of that phase as a coacervated layer around suspended core droplets. Coacervation may be brought about when the surface energies of the core droplets and coating material are adjusted varying some parameter of the system such as temperature, pH, or composition, for example. The coacervated layer is then cured by means of heat, cross-linking, and/or solvent removal techniques, yielding product microcapsules where the cured coacervated layer has been turned into solidified capsule walls.

Figure 3:
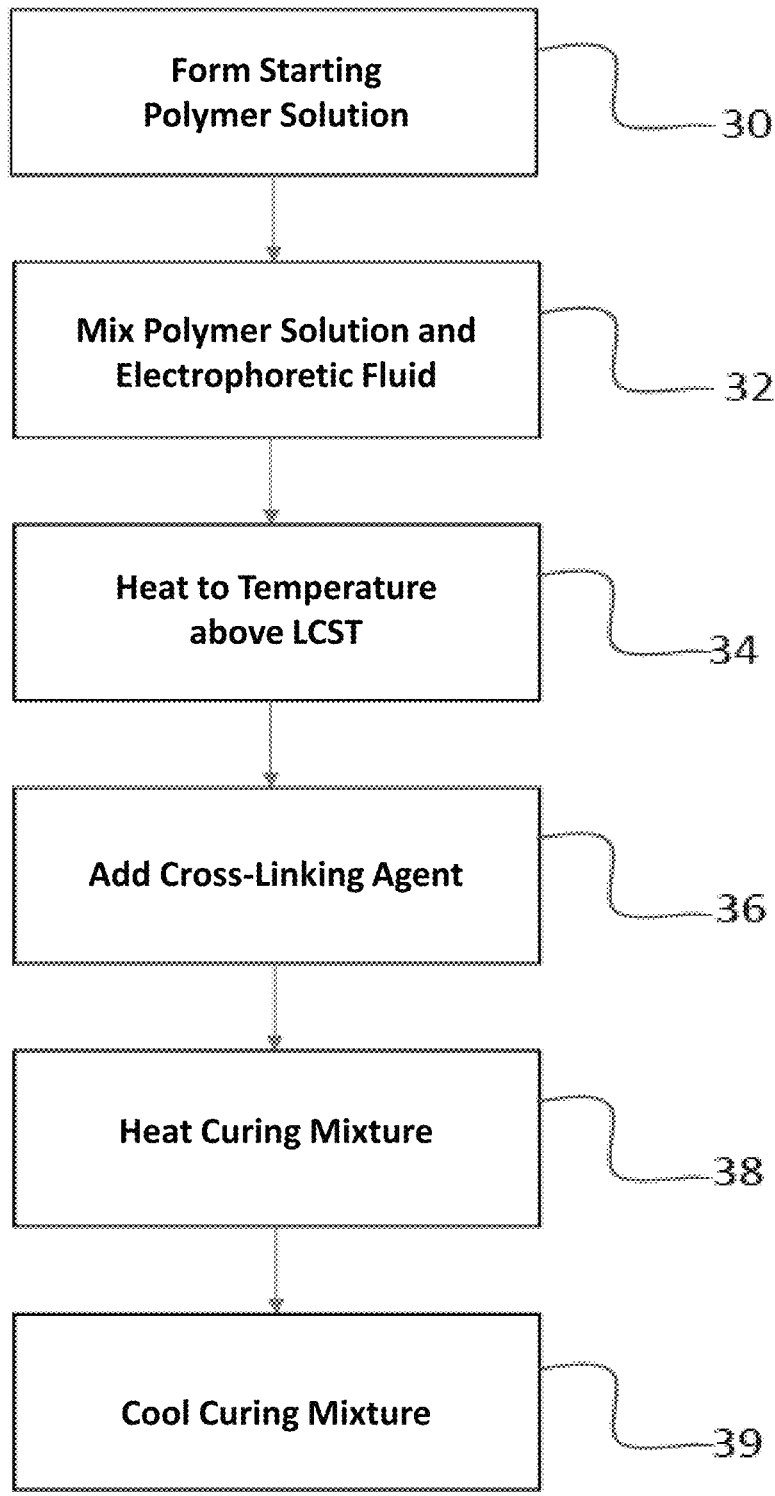
FIG. 3 is a schematic flowchart illustrating an exemplary method for encapsulating electrophoretic fluids.

FIG. 3 illustrates a representative embodiment of the method. An aqueous solution of one or more water-dispersible starting polymers is prepared (30), then mixed with the electrophoretic fluid (32), and the resulting mixture is heated to a temperature above the lowest critical solution temperature (LCST) (34). The polymer coacervates, yielding emulsified droplets. This process may be controlled by the addition of coacervation-inducing agents such as salts to the polymer solution. The efficacy of various salts at controlling the LCST is described by the empirical Hofmeister series, as is well known in the art. A cross-linking agent is then added (36), and the resulting mixture is left to react until the coacervated phase is cured, to form the capsule walls.

In one embodiment, the curing takes place in the absence of heating, and the curing mixture is left to react at the temperature at which it was formed or lower. In another embodiment, the curing mixture is heated to a higher temperature (38), either directly or by increments in a stepwise fashion, then curing is allowed to proceed to completion at the higher temperature whereupon heating is discontinued and the mixture is cooled down (39) either spontaneously or by active heat removal.

It has been found that better results are obtained when the curing is carried out in the presence of heating. Without being bound to any particular theory, one possible explanation is that, if heating is absent, the coacervated polymer on the outer layer of the capsule precursor is prone to redissolving into the aqueous medium at rates higher than the crosslinking reaction(s). The capsules produced are then separated by size by sieving or other size exclusion sorting method. Capsules beyond about 120 μm tend to be difficult to work with because they tend to break during processing from shear force. Additionally, capsules larger than 100 μm are visible to the naked eye, so their presence may be perceived as ripples in the variable transmission film.

After size sorting, the capsules are mixed with a binder to create a slurry for coating, e.g., using slot coating, knife coating, spin coating, etc. Alternatively, the capsules may be suspended and sprayed as described in U.S. Pat. No. 9,835,925, incorporated herein by reference in its entirety. In certain embodiments of the present application, the binder includes a polymer, for example water-soluble polymer such as polyvinyl alcohol that may be cationically modified, or a latex, for example comprising a polyurethane material. As anticipated above, the capsules of the present application perform surprisingly well when assessed with waveforms having the same structure as those used to drive the same electrophoretic fluids in test cells or microcells.

The following are representative examples illustrating aspects of the present invention.

EXAMPLES

Example 1—Preparing Polyvinylalcohol Microcapsules

Solutions of polyvinylpyrrolidone (112.0 g of a 20% solution, 1.3 MDa average molecular weight) and polyvinyl alcohol (74.7 g of a 10% solution, Mowiol 23-88, available from Kuraray, Japan) were mixed and stirred for an hour at 4° C., then a solution of sodium sulfate was added (88.36 g of 16.7% aqueous solution), to give a cloud point temperature of 25° C. The solution was stirred at 4° C. until the precipitate dissolved, whereupon a three-pigment electrophoretic fluid containing white, black, and red particles (120 g, of a similar fluid to that described in the aforementioned U.S. Pat. No. 8,717,664, incorporated herein by reference in its entirety) was added subsurface, after which the temperature was increased to 9° C. and the solution was stirred for 9 min at 400 rpm to form droplets.

Figure 4A:
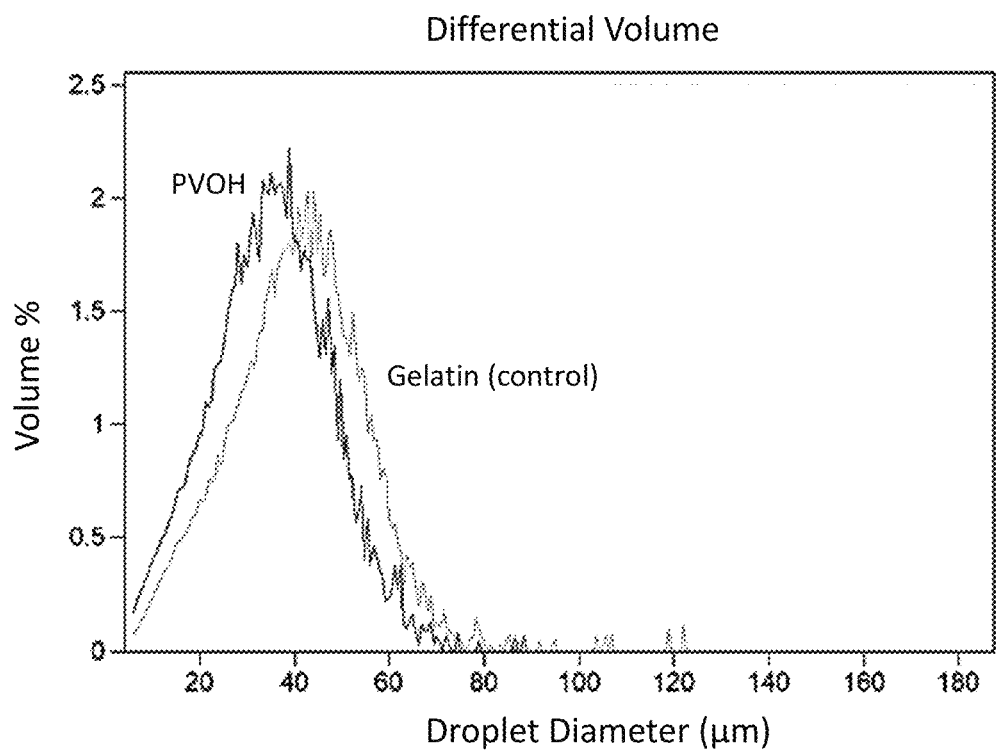
FIG. 4A shows the size distribution of droplet intermediates in an examplary process for manufacturing microcapsules according to the present application.
Figure 4B:
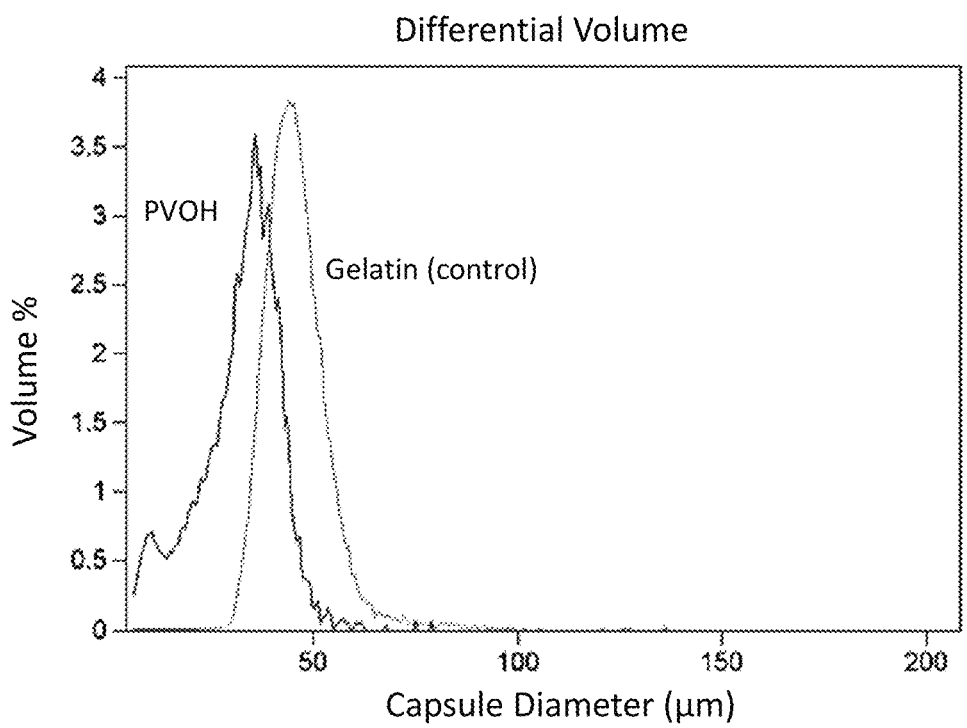
FIG. 4B shows the size distribution of microcapsules produced from the droplets of FIG. 4A.

Thirty grams of a mixture comprising 15.15 g of a 50 wt % aqueous solution of glutaraldehyde, 1.52 g of 10% acetic acid, 0.27 g of 0.9% hydrogen chloride and 13.36 g of water was then added at the temperature of 9° C. The resulting mixture was held at 9° C. for 50 min, after which the temperature was increased to 15° C. After 1 hour hold at this temperature the mixture was heated to 60° C., held at this temperature for 135 min, then cooled to 25° C. Capsules were collected by centrifugation after 30 min and stored in a refrigerator at 5° C. for one week before being purified. The force required to burst individual capsules, normalized to capsule diameter, was about 48 N/m. FIGS. 4A and 4B show the droplet and capsule size distributions of material made according to the above procedure. FIG. 4A shows the droplets prior to capsule wall formation with the invention and the gelatin control. FIG. 4B shows the invention at the end of the capsule wall-forming reaction, and after size-sorting by sieving.

Microcapsule Coating

Following the preparation and isolation of the microcapsules, they were incorporated into a coating slurry with 60 mg of cationic-modified polyvinyl alcohol polymer CM-318 (Kuraray, Japan) in aqueous solution. This slurry was coated onto a poly(ethylene terephthalate) (PET) substrate of 4 mm thickness bearing a transparent conductive coating of indium tin oxide (ITO), to give a coat having a specific weight of 21 g/m². The resulting coating of microcapsules was then built into a pixel with a carbon backplane.

FIG. 5A shows a micrograph of the microcapsule coating while FIG. 5B shows a cross-section of the coating. Although, as seen in FIG. 5A, there are several voids in the microcapsule coating, it is noteworthy that the coating is essentially a monolayer. The cross-section shows that the dried microcapsules 500 have a flattened aspect and form a uniform layer of thickness approximately 15 micrometers. For ease of visualization two capsules within the capsule layer are bounded with white polygons.

Figure 6A:
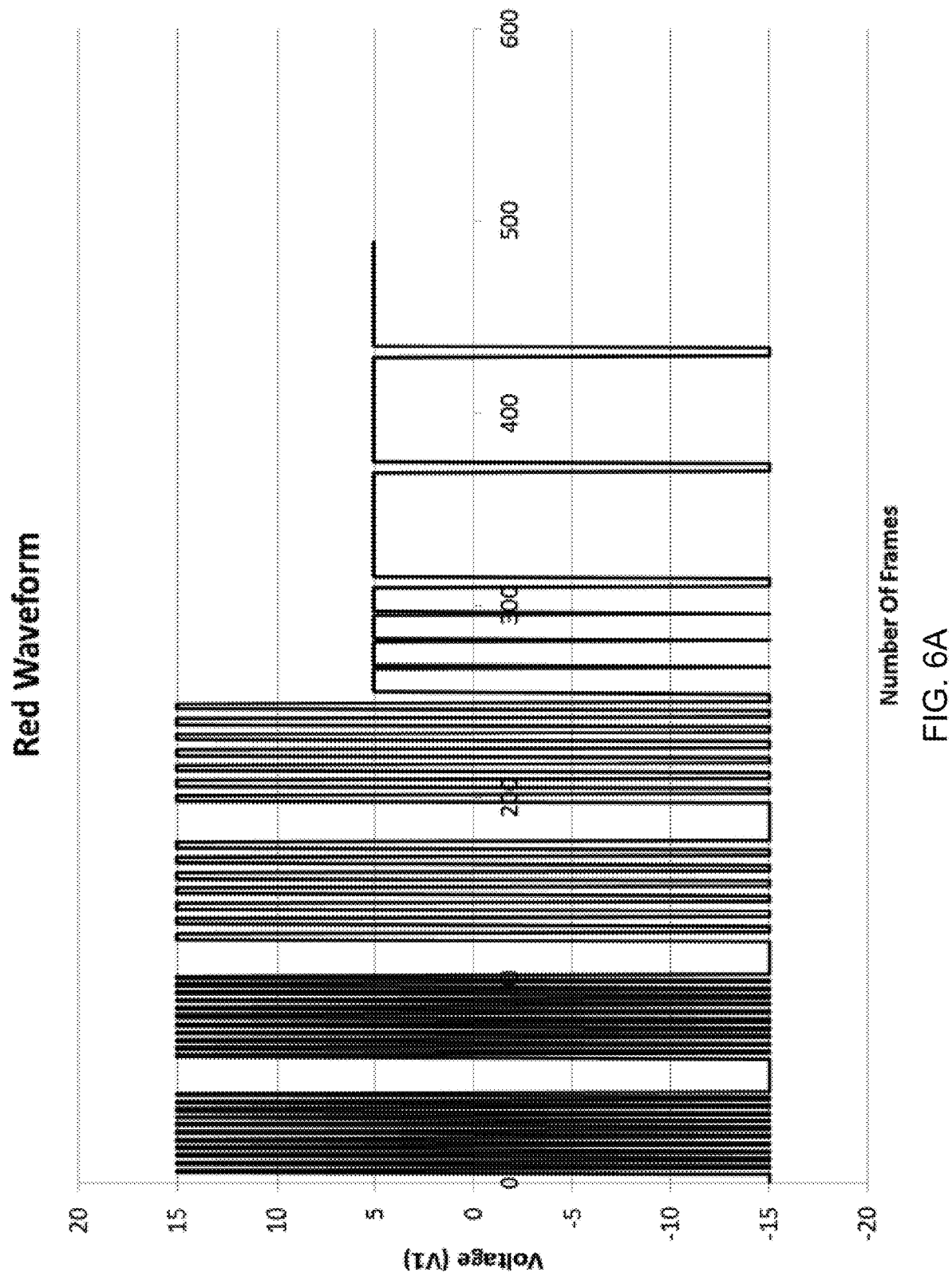
FIG. 6A illustrates an exemplary waveform for driving an electrophoretic display including an encapsulated electrophoretic medium to achieve a red display state.
Figure 6B:
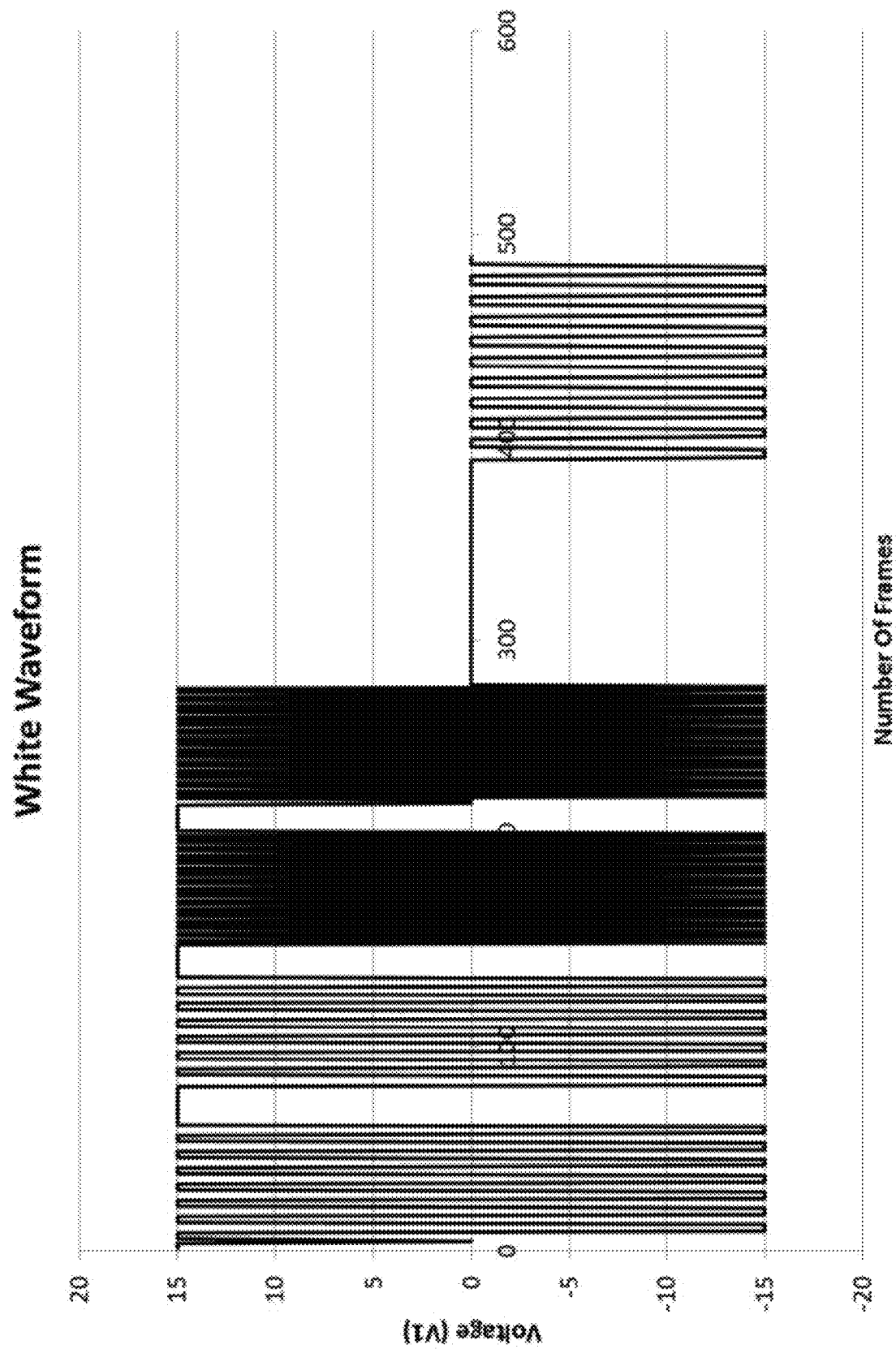
FIG. 6B illustrates a waveform for driving an encapsulated electrophoretic medium to achieve a white display state.
Figure 6C:
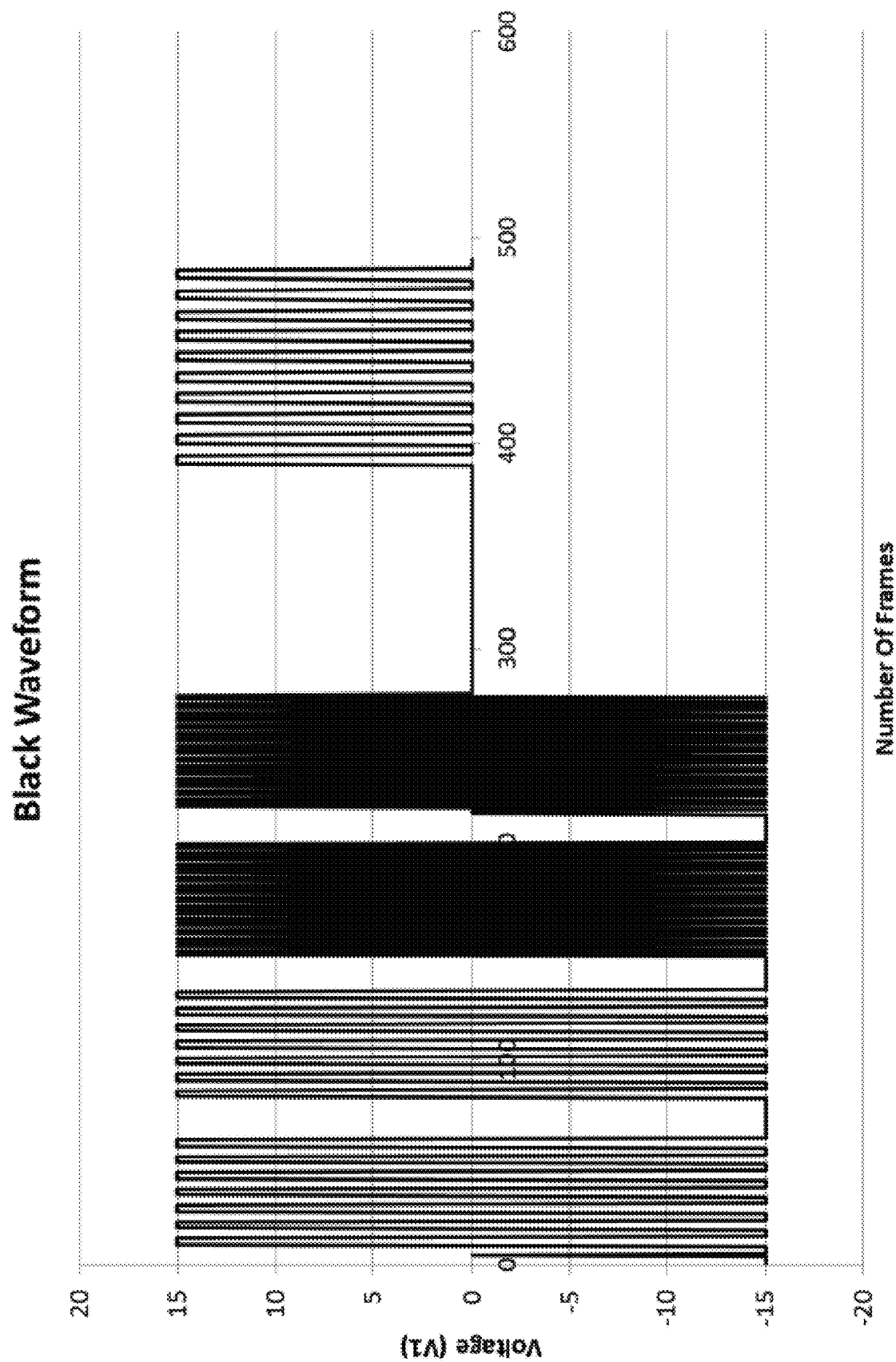
FIG. 6C illustrates a waveform for driving an encapsulated electrophoretic medium to achieve a black display state.

The test pixels formed as described above were switched using conventional waveforms as described in FIGS. 6A-6C. The same electrophoretic fluid containing black, white, and red particles was also incorporated into microcells and gelatin/acacia capsules, and the resulting products were formed into pixels and switched with the same conventional waveforms used for the above microcapsules.

The performance of the test pixels was quantified according to the CIELAB (also known as CIE L*a*b*) color space and is reported below in Table 1:

TABLE 1

Comparison of CIELAB electro-optical performance of three-color electrophoretic medium in differing encapsulating structures.

| | Microcells | | | Gelatin/acacia capsules | | | PVOH capsules | | |
|---|---|---|---|---|---|---|---|---|---|
| | L* | a* | b* | L* | a* | b* | L* | a* | b* |
| White | 69.7 | 0.02 | −0.3 | 68.0 | −1.2 | −1.1 | 70.9 | −1.0 | −2.7 |
| Black | 13.6 | 1.9 | −3.6 | 15.8 | 13.2 | 3.0 | 15.2 | 4.2 | −1.9 |
| Red (5 V) | 30.2 | 40.5 | 18.6 | 38.1 | 29.4 | 3.2 | 50.9 | 20.4 | 3.5 |
| Red (8 V) | 22.3 | 26.1 | 11.4 | 28.4 | 30.9 | 11.5 | 33.4 | 38.0 | 18.4 |

It can be seen that the microcells and polyvinyl alcohol capsules can achieve good white, black and red states, and produce the same colors when addressed with the traditional voltage sequences of U.S. Pat. No. 8,717,664. However, gelatin/acacia capsules cannot, in this case, achieve either a neutral black state or a red state with a*>31. It is readily apparent that the behavior of the same electrophoretic fluids is very different when they are contained in gelatin/acacia microcapsules, and the correct colors cannot be obtained. This is unexpected as gelatin/acacia microcapsules have been shown to provide excellent performance for black and white displays, and were believed to perform just as well with more complex electrophoretic fluids.

Without wishing to be bound to any particular theory, it is known that in gelatin/acacia the amount of microcapsule wall charge is a function of pH. In a coating slurry the pH is typically adjusted to be alkaline so as to ensure that carboxylate groups in the capsule walls are ionized. When these groups are charged (as they are at high pH) the capsules have a reduced tendency to stick together, whereas at low pH the inter-capsule sticking can cause the viscosity of the slurry to be too high for efficient coating. When the electrophoretic fluid contains more than two pigments, however, it may not be desirable to raise the pH of the coating solution, as the materials added to achieve this may interfere with the final performance of the electrophoretic display. In some instances it may be possible to restore satisfactory performance by adjusting the addressing waveform and recover the desired optical states in gelatin/acacia microcapsules, but typically it is necessary to make substantial chemical adjustments to the electrophoretic fluids themselves. It would be preferable to have a more pH-insensitive coating slurry.

Moreover, capsules with charged walls may also stick to the substrate onto which they are coated, and therefore lose the ability to rearrange efficiently to form a monolayer coating. Although manufacturing processes can be controlled so as to produce an even coating with capsules having charged walls, typically monolayer coatings are much more readily produced using capsules without a wall charge.

It is also noteworthy that forming the polyvinylalcohol microcapsules required much shorter time than the conventional process used to form gelatin/acacia capsules. The 120 g batch of electrophoretic fluid were encapsulated in the polyvinyl alcohol-based capsules in roughly 4 hours, while the standard gelatin/acacia process usually takes over 13 hours.

Example 2—Enhanced Capsule Size Discrimination

Additional microcapsules with full-color (CMYW) electrophoretic fluid were formed using a non-ionic polymer formulation similar to Example 1, above. An electrophoretic fluid was prepared by combining and mixing overnight the following ingredients: a dispersion containing white pigment (71.41 g of a 55.71 wt % dispersion; polymer-coated $TiO_2$ as described in U.S. Pat. No. 8,582,196), a dispersion containing a magenta pigment (15.21 g of a 24.99 wt % dispersion; C.I. Pigment Red 122, coated with vinylbenzyl chloride and laurylmethacrylate (LMA) as described in U.S. Pat. No. 9,697,778), a dispersion containing cyan pigment (14.23 g of a 25.43 wt % dispersion; C.I. Pigment Blue 15:3 coated with methyl methacrylate (MMA) and dimethylsiloxane), a dispersion containing a yellow pigment (13.64 g of a 35.62 wt % dispersion; C.I. Pigment Yellow 155 coated with methyl methacrylate (MMA), 2, 2, 2-trifluoroethyl methacrylate (TFEM) and monomethacryloxypropyl terminated polydimethylsiloxane), CCA111 (3.04 g of a 75 wt % solution), poly(isobutylene) of average molecular weight greater than 500,000 (3.67 g of a 9.94 wt % solution of PIB in ISOPAR® E) and balanced with additional ISOPAR® E.

Solutions of polyvinyl pyrrolidone (74.07 g of a 15% solution, 1.3 MDa molecular weight) and polyvinyl alcohol (55.55 g of a 10% solution, Mowiol 23-88, available from Kuraray, Otemachi, Chiyoda, Tokyo, Japan) and 152.38 g of water were mixed and stirred for an hour at 5° C., then a solution of sodium sulfate was added (88.36 g of 16.7% aqueous solution). The resulting mixture has a cloud point temperature ≤10° C. The solution was stirred at 5° C. until the precipitate dissolved, whereupon 120 g of the electrophoretic fluid described above was added subsurface, and the solution was stirred for 66 min at 600 rpm to form droplets.

At that point, 30 g of a mixture comprising: 15.15 g of a 50% aqueous solution glutaraldehyde, 1.52 g of 10% acetic acid, 0.27 g of 0.9% hydrogen chloride and 13.36 g of water, was added at 5° C., and the pH adjusted to 2.6 with 0.239 g of hydrogen chloride (37%). Next the temperature increased to 52° C. and hold at that temperature for 75 min, before cooling it down to 25° C. The formed capsules were collected and cleaned by a sieving method. The force required to burst individual capsules, normalized to capsule diameter, was about 335.1 N/m.

Figure 7:
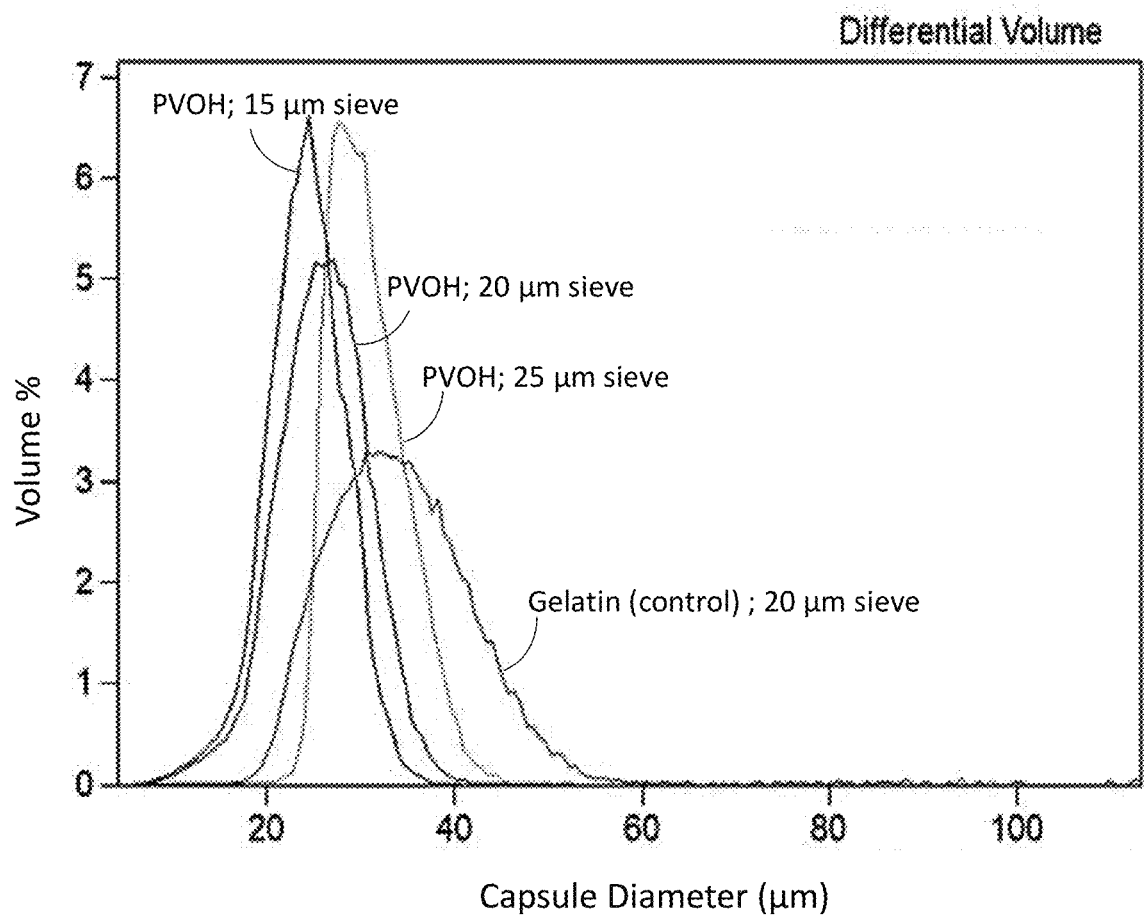
FIG. 7 shows the size distribution of non-ionic polymeric microcapsules after sieving with various sieve sizes and comparison to state of the art gelatin capsules.

The capsules produced were washed and separated by size by sieving. In many cases the portion passing through the sieves included burst capsules and cross-linked blobs of polymer that did not actually encapsulate electrophoretic internal phase (charged pigment particles distributed in hydrocarbon solvent). Different sieves with various opening sizes (25 μm, 20 μm, 15 μm) were used to collect the different capsule fractions, and the capsule size distributions were measured. (See FIG. 7.) For comparison, a standard gelatin acacia microcapsule formulation was also prepared using the above CMYW electrophoretic fluid and sieved at 20 μm. The SVD mean size for the distributions shown in FIG. 7 were 35 μm for the gelatin control, 31 μm for the PVOH capsules sieved at 25 μm, 26 μm for the PVOH capsules sieved at 20 μm, and 24 μm for the PVOH capsules sieved at 15 μm. Additionally, the total time of encapsulation and separation is greatly reduced from the standard gelatin-acacia procedure. For example, 120 g of electrophoretic fluid can be encapsulated in polyvinyl alcohol in about 3.5 hours, while the gelatin/acacia process typically requires over 13 hours. A comparison of the capsule size distribution for PvOH capsules made as above and sieved at 15 μm versus standard gelatin acacia microcapsules sieved at 20 μm is shown in Table 2.

TABLE 2

Comparison of the capsule size distribution for PvOH capsules sieved at 15 μm versus standard gelatin acacia microcapsules sieved at 20 μm. Both types of capsules are filled with an electrophoretic fluid including four different types of charged pigment particles.

| | Number % capsules 15-45 um | Number % capsules less than 15 um | Volume % capsules 15-45 um | Volume % capsules less than 15 um |
|---|---|---|---|---|
| Gelatin/ 20 μm sieve | 34.1 | 65.7 | 84 | 12.2 |
| PvOH// 15 μm sieve | 71.49 | 28.5 | 94.99 | 4.71 |

A further analysis of the mass balance of the various processes indicated that the PVOH encapsulation process increased the yield of encapsulated electrophoretic media, in comparison to the standard gelatin encapsulation method. This results in less pigment being wasted because it was not encapsulated during the process.

Following the preparation and isolation of the microcapsules, they were incorporated into a coating slurry with 60 mg of modified polyvinyl alcohol polymer CM318 in aqueous solution. This slurry was coated onto a poly(ethylene terephthalate)(PET) substrate of 4 mil thickness bearing a transparent conductive coating of indium tin oxide (ITO) to give a coat weight of 21 g/m2. The resulting coating of microcapsules was built into a test pixel with a carbon backplane using methods described in detail in U.S. Pat. No. 6,982,178, incorporated by reference herein in its entirety. The quality of the coatings obtained with the 15 μm sieved PvOH capsules can be seen in FIGS. 8A and 8B. Furthermore, comparing FIGS. 8A and 8B to FIGS. 5A and 5B, it is readily evident that the sieving process results in a smaller and more uniform capsule distribution, resulting in a very thin (12 μm) and regular monolayer of capsules (See FIG. 8B). In the cross-sectional view, exemplary white ovals have been drawn on the capsule layer to illustrate the approximate size of the capsules in the capsule layer (FIG. 8B). Importantly, because the resulting capsules are smaller than standard gelatin capsules, the charged pigment particles can move back and forth to the viewing surface faster when driven with standard voltage driving, thereby improving the update experience for the viewer.

Test pixels similar to the one shown in FIGS. 8A and 8B were driven using conventional waveforms for a four-particle full color electrophoretic medium, e.g., as described in U.S. Pat. No. 9,921,451, incorporated by reference herein in its entirety. The PvOH capsules showed a color gamut slightly larger when compart to the gelatin-acacia control.

TABLE 3

Comparison of calculated color gamuts and measured dSNAP values for four-particle full color electrophoretic media in PvOH and gelatin acacia microcapsules.

| Capsule Wall material | Color Gamut | Average dSNAP |
|---|---|---|
| PvOH, 25 um sieve | ~103,964 | 5.0 |
| PvOH, 20 um sieve | ~72,725 | 7.00 |
| PvOH, 15 um sieve | ~68,132 | 7.25 |
| Gelatin-Acacia, 20 um sieve | ~84,000 | 5.5 |

The various test pixels were additionally evaluated for switching speed. The PvOH capsules showed slightly higher color gamut than the gelatin-acacia counterpart at both 18 and 42 frames when driven with a alternating primary color test pattern, which corresponds to ~500 and 210 milliseconds switching time, respectively. Higher color gamut at same frame rate indicates faster switching speed for PvOH capsules compared to the gelatin-acacia. Smaller PVOH fraction showed higher color gamut at 18 frames, which means switching speed of smaller size capsules can be potentially faster than control.

TABLE 4

Color gamut calculations based upon measurements of color saturation at various frames in a color test pattern indicated that the switching speed for the same pigments is faster in the PvOH capsules as compared to the gelatin acacia capsules.

| Capsule Wall material | Color Gamut (42 frames) | Color Gamut (18 frames) |
|---|---|---|
| PvOH, 25 um sieve | ~32,571 | ~9,155 |
| PvOH, 20 um sieve | ~31,617 | ~10,341 |
| PvOH, 15 um sieve | ~31,399 | ~11,449 |
| Gelatin-Acacia, 20 um sieve | ~27,000 | ~8,000 |

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

We claim:

1. A method for producing a capsule encapsulating an electrophoretic medium, the method comprising:
   providing a first polymer solution comprising a nonionic, water-soluble or water-dispersible first starting polymer in an aqueous solvent, wherein the first starting polymer is a polyol;
   providing a second polymer solution comprising a polyvinyl lactam in an aqueous solvent;
   mixing the first polymer solution with the second polymer solution to form a third polymer solution;
   providing an electrophoretic fluid comprising a suspending solvent and pigment particles;
   mixing the third polymer solution and the electrophoretic fluid to create a reaction mixture;
   heating the reaction mixture to a temperature above the lowest critical solution temperature of the third polymer solution to form a coacervate, thereby forming an oil-in-water emulsion including the electrophoretic fluid;
   adding a cross-linking agent to the oil-in-water emulsion, thereby forming a curing mixture; and
   heating the curing mixture to form capsules encapsulating an electrophoretic medium.

2. The method according to claim 1, further comprising a step of cooling the curing mixture after the heating step.

3. The method according to claim 1, wherein the first starting polymer is a polyvinyl alcohol.

4. The method according to claim 3, wherein the mean molecular weight of the polyvinyl alcohol is at least about 10,000 Daltons.

5. The method according to claim 3, wherein the mean molecular weight of the polyvinyl alcohol is 100,000 Daltons or lower.

6. The method according to claim 1, wherein the first polymer solution comprises a copolymer of vinyl acetate.

7. The method according to claim 1, wherein the second polymer solution comprises polyvinylpyrrolidone.

8. The method according to claim 1, wherein the cross-linking agent is a glutaraldehyde.

9. The method according to claim 1, further comprising adding a coacervation inducer to the third polymer solution.

10. The method according to claim 9, wherein the coacervation inducer is a water-soluble or water-dispersible salt.

11. The method according to claim 1, wherein the electrophoretic fluid comprises a first, a second, and a third types of pigment particles.

12. The method according to claim 11, wherein two of the three types of pigment particles carry opposite charge polarities and the third type of pigment particles is slightly charged.

13. The method according to claim 12, wherein the third type of pigment particles has larger size than the size of the first type of particles and the second type of particles.

14. The method according to claim 11, wherein the electrophoretic fluid further comprises a fourth type of pigment particles.

15. The method according to claim 14, wherein the electrophoretic fluid comprises white, cyan, yellow, and magenta pigment particles.

16. The method according to claim 14, wherein the electrophoretic fluid comprises black, red, yellow and blue pigment particles.

17. The method according to claim 1, wherein the suspending solvent comprises a hydrocarbon.

18. The method according to claim 1, wherein the suspending solvent has a dielectric constant in the range of about 2 to about 30.

19. The method according to claim 18, wherein the suspending solvent has a dielectric constant in the range of about 2 to about 15.

20. The method according to claim 1, wherein the capsules have an average diameter between 15 μm and 50 μm, and wherein less than one third of the capsules (by number) are smaller than 15 μm or larger than 50 μm.

* * * * *